United States Patent
Pramod et al.

(10) Patent No.: US 11,884,341 B2
(45) Date of Patent: Jan. 30, 2024

(54) ACTIVE MOTOR CURRENT LIMITING OF SYNCHRONOUS MOTOR DRIVES

(71) Applicant: Steering Solutions IP Holding Corporation, Saginaw, MI (US)

(72) Inventors: Prerit Pramod, Saginaw, MI (US); Krishna M P K Namburi, Okemos, MI (US); Nakul Shah, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 296 days.

(21) Appl. No.: 17/496,206

(22) Filed: Oct. 7, 2021

(65) Prior Publication Data
US 2022/0105978 A1 Apr. 7, 2022

Related U.S. Application Data

(60) Provisional application No. 63/088,585, filed on Oct. 7, 2020.

(51) Int. Cl.
*B62D 5/04* (2006.01)
(52) U.S. Cl.
CPC ......... *B62D 5/0463* (2013.01); *B62D 5/0409* (2013.01)

(58) Field of Classification Search
CPC .. B62D 5/0463; B62D 5/0409; B62D 5/0481; H02P 29/60; H02P 21/0003
USPC ............................................... 701/41, 42, 43
See application file for complete search history.

(56) References Cited

U.S. PATENT DOCUMENTS

| | | | |
|---|---|---|---|
| 11,312,409 B2 * | 4/2022 | Kato | H02P 21/04 |
| 2020/0317257 A1 * | 10/2020 | Ootake | B62D 5/0481 |
| 2021/0155285 A1 | 5/2021 | Li et al. | |

* cited by examiner

*Primary Examiner* — Hai H Huynh
(74) *Attorney, Agent, or Firm* — Dickinson Wright PLLC

(57) ABSTRACT

A method of controlling operation of an electric machine includes: calculating a voltage-based torque limit based on a voltage constraint of a direct current (DC) bus supplying power to an inverter for powering the electric machine; calculating a current-based torque limit based on a motor current limit; determining a final torque limit based on the voltage-based torque limit and the current-based torque limit; determining a limited command torque based on a torque command and the final torque limit; and generating at least one current command based on, at least, the limited command torque. A control system for controlling operation of an electric machine is also provided.

20 Claims, 6 Drawing Sheets

ACTIVE MOTOR CURRENT LIMITING OF SYNCHRONOUS MOTOR DRIVES

CROSS-REFERENCES TO RELATED APPLICATIONS

This patent application claims priority to U.S. Provisional Patent Application Ser. No. 63/088,585, filed Oct. 7, 2020, which is incorporated herein by reference in its entirety.

TECHNICAL FIELD

This disclosure relates to electric machines, and in particular to controlling operation of an electric machine using a motor drive.

BACKGROUND

A vehicle, such as a car, truck, sport utility vehicle, crossover, mini-van, marine craft, aircraft, all-terrain vehicle, recreational vehicle, or other suitable vehicle, typically includes one or more electric machines, such as electric motors and the like. For example, the vehicle may include one or more multiphase electric machines configured to control various aspects of a steering system of the vehicle.

Power management is an important consideration in controlling electric motor drives to regulate power being delivered to and recovered from an electric motor. Active power management involves consideration of multiple constraints simultaneously to determine achievable torque. Constraints include supply voltage, supply (regenerative) current and inverter (motor) currents.

An optimal current command search technique is used for some motor controllers, such as for controlling Permanent Magnet Synchronous Motors (PMSMs) in electric power steering (EPS) systems. Such a technique may take a number of inputs, including, for example, DC bus voltage, motor velocity, torque command, and machine parameters to calculate optimal d,q-axis current commands based on those inputs. The optimal or optimized current commands may be d,q-axis current commands calculated or otherwise chosen to meet one or more constraints, such as a DC bus voltage constraint, while also causing the PMSM to produce a desired torque using the least amount of current.

Accordingly, the torque output of the PMSM is maximized with minimum current magnitude, which is helpful to reduce copper losses. In this technique, the actual machine current magnitude is not limited to a specific value. Instead, the technique makes the machine current magnitude as low as possible given the operating conditions.

SUMMARY

This disclosure relates generally to controlling operation of an electric machine using a motor drive.

An aspect of the disclosed embodiments includes a method of controlling operation of an electric machine. The method includes: calculating a voltage-based torque limit based on a voltage constraint of a direct current (DC) bus supplying power to an inverter for powering the electric machine; calculating a current-based torque limit based on a motor current limit; determining a final torque limit based on the voltage-based torque limit and the current-based torque limit; determining a limited command torque based on a torque command and the final torque limit; and generating at least one current command based on, at least, the limited command torque.

An aspect of the disclosed embodiments includes a control system for controlling operation of an electric machine. The control system includes a processor and a memory. The memory includes instructions that, when executed by the processor, cause the processor to: calculate a voltage-based torque limit based on a voltage constraint of a direct current (DC) bus supplying power to an inverter for powering the electric machine; calculate a current-based torque limit based on a motor current limit; determine a final torque limit based on the voltage-based torque limit and the current-based torque limit; determine a limited command torque based on a torque command and the final torque limit; and generate at least one current command based on, at least, the limited command torque.

An aspect of the disclosed embodiments includes a control system for controlling operation of an electric machine. The control system comprises an inverter including a plurality of switches operable to supply an alternating current to the electric machine. The control system also comprises a controller operable to: calculate a voltage-based torque limit based on a voltage constraint of a direct current (DC) bus supplying power to an inverter for powering the electric machine; calculate a current-based torque limit based on a motor current limit; determine a final torque limit based on the voltage-based torque limit and the current-based torque limit; determine a limited command torque based on a torque command and the final torque limit; generate at least one current command based on, at least, the limited command torque; and selectively control the plurality of switches within the inverter to cause the inverter to supply the alternating current to the electric machine based on the at least one current command.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, typically includes one or more electric machines, such as electric motors and the like. For example, the vehicle may include one or more multiphase electric machines configured to control various aspects of a steering system of the vehicle.

An optimal current command search technique is used for some motor controllers, such as for controlling Permanent Magnet Synchronous Motors (PMSMs) in electric power steering (EPS) systems. Such a technique may take a number of inputs, including, for example, DC bus voltage, motor velocity, torque command, and machine parameters to calculate optimal d,q-axis current commands based on those inputs. The calculated d,q-axis current commands may be chosen to meet a DC bus voltage constraint, while also being optimized for torque/current ratio.

Accordingly, the torque output of the PMSM is maximized with minimum current magnitude, which is helpful to reduce copper losses in the windings of the PMSM. In this technique, the actual machine current magnitude is not limited to a specific value. Instead, the technique makes the machine current magnitude as low as possible given the operating conditions.

According to an aspect of the disclosure, a motor current limit $I_i^{lim}$ is taken as a constraint in an optimization technique in which both DC bus voltage and the machine current are kept within specified values.

According to an aspect of the disclosure, a method of controlling operation of an electric machine includes the motor current limit $I_i^{lim}$ and the voltage constraint $V_{DC}$ of the DC bus 215 each being taken as constraints to solve an optimization problem in which both DC bus voltage and machine current $I_i$ are maintained within corresponding specified values. The motor current limit $I_i^{lim}$ is considered as another constraint in addition to the voltage constraint $V_{DC}$ of the DC bus 215. A goal of the method and system of the present disclosure is to find the maximum achievable torque satisfying the voltage constraint $V_{DC}$ of the DC bus 215 and the motor current limit $I_i^{lim}$.

Figure 1:
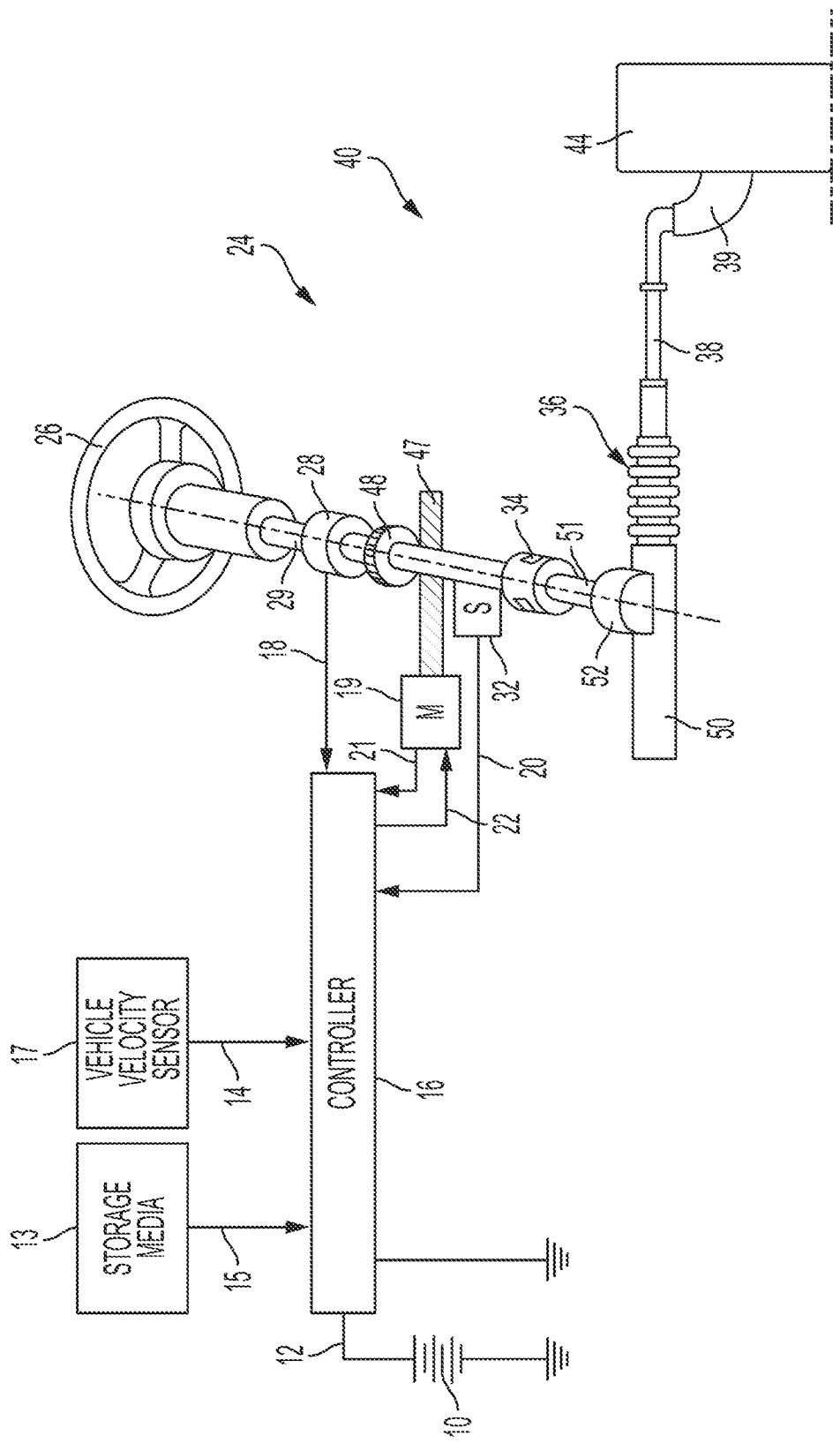
FIG. 1 generally illustrates a schematic diagram of an electric power steering system according to the principles of the present disclosure.

FIG. 1 generally illustrates a schematic diagram of an electric power steering system (EPS) 40 suitable for implementation of the disclosed techniques. The EPS includes a steering mechanism 36, which includes a rack-and-pinion type mechanism having a toothed rack (not shown) within housing 50 and a pinion gear (also not shown) located under gear housing 52. As the operator input, hereinafter denoted as a steering wheel 26 (e.g. a hand wheel and the like), is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through a control system 24, which includes the controller 16 and an electric machine 19, which may be a permanent magnet synchronous motor (PMSM), and is also denoted as motor 19. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position $\theta$ as measured by a position sensor 32 over a prescribed time interval. For example, motor speed $\omega_m$ may be determined as the derivative of the motor position $\theta$ from the equation $\omega_m = \Delta\theta/\Delta t$ where $\Delta t$ is the sampling time and $\Delta\theta$ is the change in position during the sampling interval. Alternatively, motor velocity may be derived from motor position as the rate of change of position with respect to time. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. controller 16 is disposed in communication with the various systems and sensors of the motor control system. controller 16 receives signals from each of the system sensors, quantifies the received information, and provides an output command signal(s) in response thereto, in this instance, for example, to the motor 19. controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 16 operates in a feedback control mode, as a current regulator, to generate the command 22. Alternatively, in one or more examples, the controller 16 operates in a feedforward control mode to generate the command 22. Because these voltages are related to the position and speed of the motor 19 and the desired torque, the position and/or speed of the rotor and the torque applied by an operator are determined. The position sensor 32 is connected to the steering shaft 51 to detect the angular position θ. The position sensor 32 may sense the rotary position based on optical detection, magnetic field variations, or other methodologies. The position sensor 32 may include one or more potentiometers, resolvers, synchros, encoders, and the like. The position sensor 32 outputs a position signal 20 indicating the angular position of the steering shaft 51 and thereby, that of the motor 19.

Desired torque may be determined by one or more torque sensors 28 transmitting torque signals 18 indicative of an applied torque. Such a torque sensor 28 and the torque signal(s) 18 therefrom, as may be responsive to a compliant torsion bar, T-bar, spring, or similar apparatus (not shown) configured to provide a response indicative of the torque applied.

The position signal 20, motor velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time-based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces.

Figure 2:
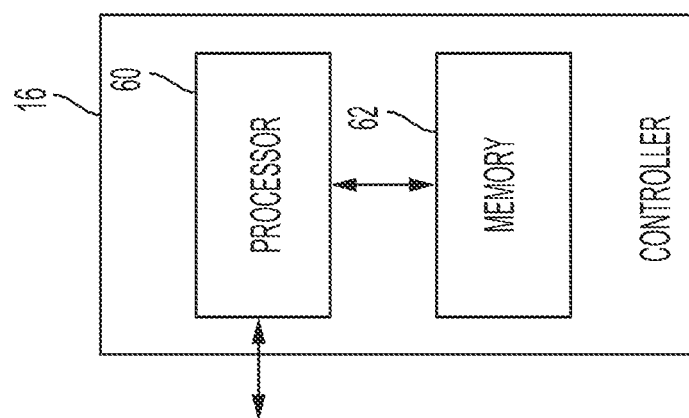
FIG. 2 generally illustrates a controller according to the principles of the present disclosure.

As is generally illustrated in FIG. 2, the controller 16 may include any suitable controller. The controller 16 may be configured to control, for example, various aspects of a vehicle, such as aspect of an electronic power steering system and/or other suitable features or components of the vehicle. The controller 16 may include a processor 60 and a memory 62.

The processor 60 may include any suitable processor, such as those described herein. Additionally, or alternatively, the controller 16 may include any suitable number of processors, in addition to or other than the processor 60. The memory 62 may comprise a single disk or a plurality of disks (e.g., hard drives), and includes a storage management module that manages one or more partitions within the memory 62. In some embodiments, memory 62 may include flash memory, semiconductor (solid state) memory or the like. The memory 62 may include Random Access Memory (RAM), a Read-Only Memory (ROM), or a combination thereof. The memory 62 may include instructions that, when executed by the processor 60, cause the processor 60 to, at least, control various functions of the vehicle.

Figure 3:
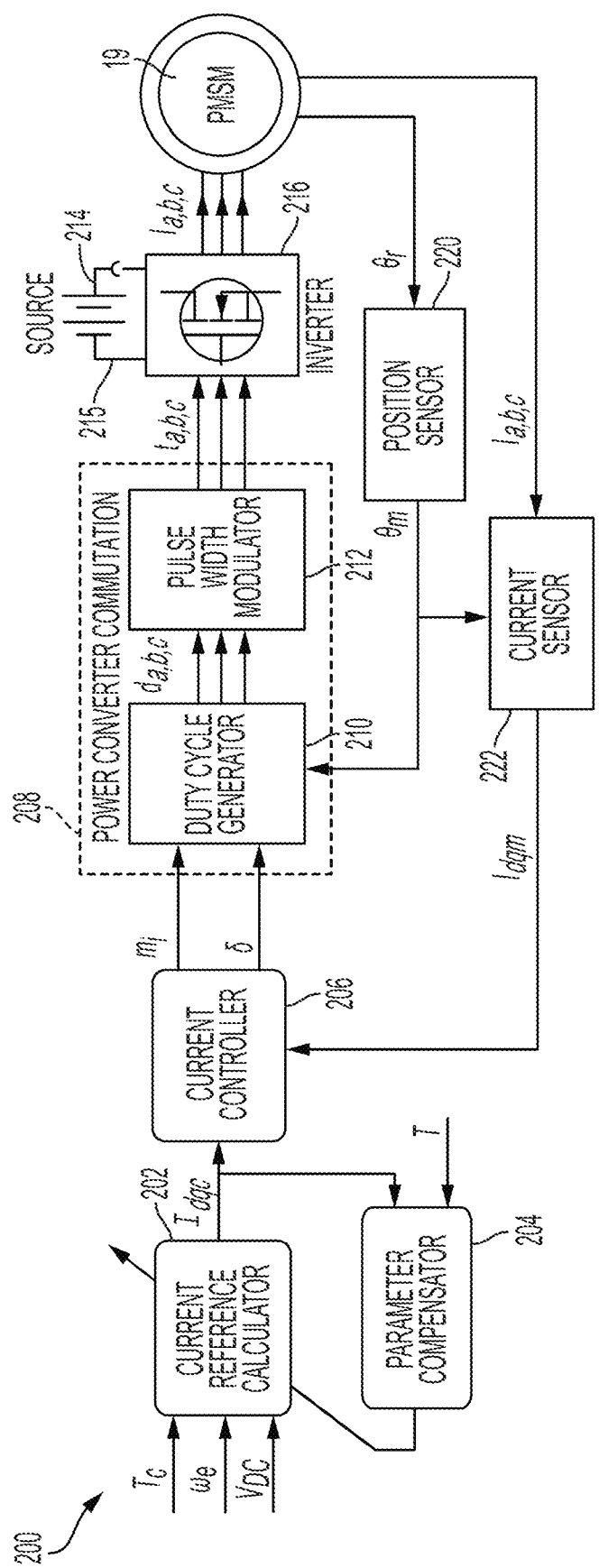
FIG. 3 generally illustrates a block diagram of an electric machine controller according to the principles of the present disclosure.

In some embodiments, the controller 16 may be configured to control various aspects of an electric machine, such as the motor control system 200, as is generally illustrated in FIG. 3. In some embodiments, as is generally illustrated, the motor control system 200 may include a three-phase PMSM controller. However, the motor control system 200 may include any suitable number of phases. Additionally, or alternatively, while the motor control system 200 is generally illustrated and described as being associated with a vehicle and the systems thereof, the motor control system 200 may be configured to control or be operatively associated with any suitable application in addition to or besides the vehicle (e.g., the motor 19 may be used in any suitable application other than a vehicle, and the principles of the present disclosure may apply accordingly).

The present disclosure provides a motor control system 200 for controlling operation of an electric machine, such as the motor 19. The present disclosure may be applied to controlling various types of synchronous electric machines, such as PMSMs, wound-field electric machines, synchronous reluctance machines, etc. The principles of the present disclosure may be used for controlling a salient pole electric machine and/or a non-salient pole electric machine. The principles of the present disclosure may be used for controlling a wound rotor synchronous machine.

The current reference calculator 202 converts the torque command $T_c$ into d/q current references $I_{dqc}$, which are then sent to the current controller 206. The current controller 206 may be a feedback regulator utilizing current measurements or a feedforward compensator. The temperature T can be fed into a parameter compensator 204 to adjust the PMSM electrical parameters as necessary. The current controller 206 then generates the d/q voltage command, which are equivalent to a commanded modulation index $m_i$ and phase advance angle δ. The $m_i$ and δ are converted to an equivalent duty cycle signal $d_a$, $d_b$, $d_c$ for each of three phases a, b, c, respectively, by the duty cycle generator 210 of the power converter commutation module 208.

Once the equivalent duty cycle signals $d_a$, $d_b$, $d_c$ for each phase are generated, the pulse width modulator 212 then generates corresponding on-times $t_a$, $t_b$, $t_c$ for the different switches (e.g., FETs) in the phase legs of the power converter (e.g., the inverter 216). The duty cycle signals $d_a$, $d_b$, $d_c$ may be labeled $d_{a,b,c}$ collectively, and the on-times $t_a$, $t_b$, $t_c$, may be labeled $t_{a,b,c}$ collectively. The inverter 216, powered by a source 214, then supplies the desired voltages to an electric machine (e.g., the motor 19), which produces phase currents $I_a$, $I_b$, $I_c$, and electromagnetic torque $T_e$. The inverter 216 is connected to the source 214 via a direct current (DC) bus 215. The position $\theta_r$ and phase currents $I_a$, $I_b$, $I_c$, are then measured and fed back to the position sensor 220 and the current sensor 222, respectively, of the control system to close the control loop. The phase currents $I_a$, $I_b$, $I_c$, may be labeled $I_{a,b,c}$ collectively. The measured position Om is used with the phase currents to compute the d/q measured currents $I_{dqm}$ which are utilized for closed-loop current control. A voltage source inverter (VSI) is typically employed as the power converter in PMSM based electric drives. Each of the phases of the motor 19 is connected to a corresponding phase leg of the inverter 216, and each of the phase legs may have two or more switches.

While the design and structure of the actual machine are different for three phase and multiphase (greater than three phases) PMSMs, the same principle of vector control in the synchronous or d/q reference frame is possible for all these machines by using the appropriate transformation matrices for converting phase currents and voltages into the equivalent DC quantities in the synchronous frame.

Figure 4:
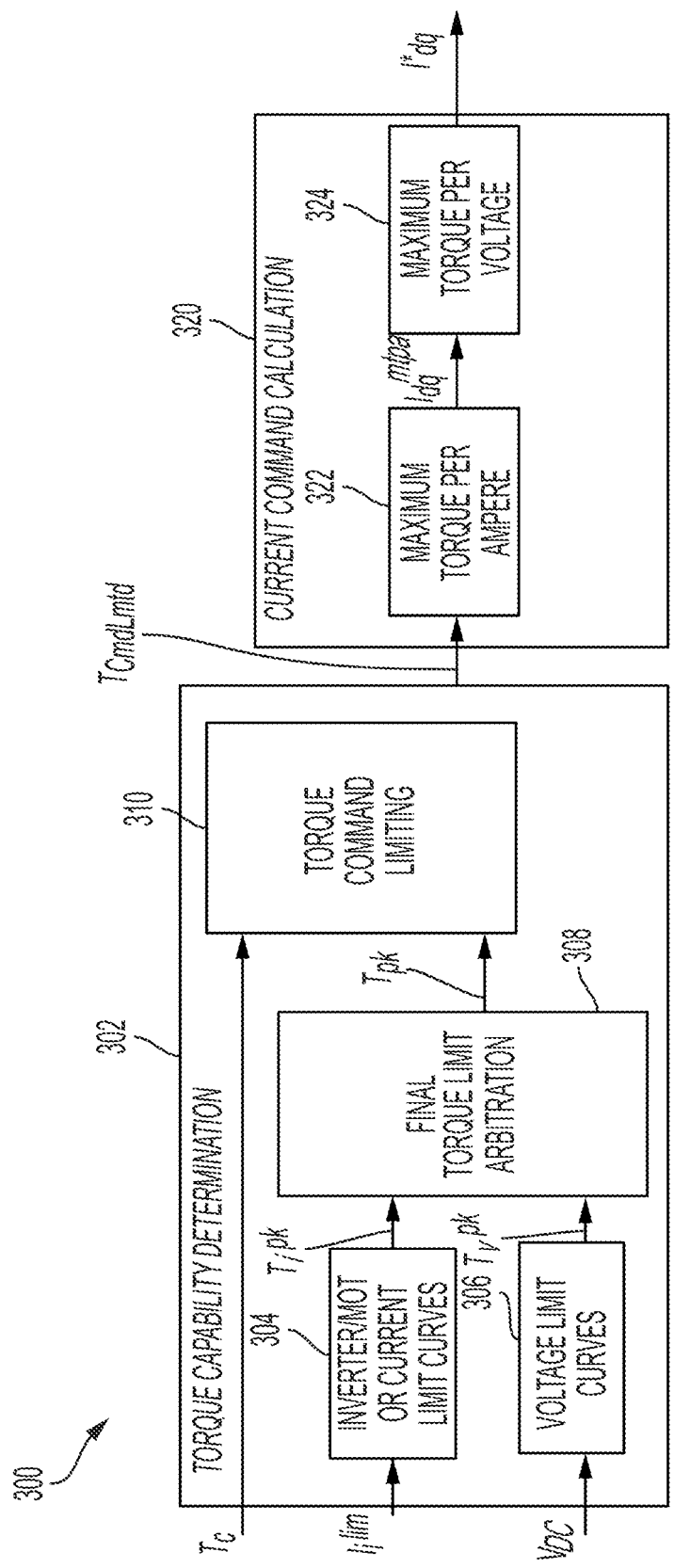
FIG. 4 generally illustrates a block diagram of an example algorithm for controlling an electric machine, according to aspects of the present disclosure.

FIG. 4 generally illustrates a block diagram of an example algorithm 300 for controlling an electric machine according to aspects of the present disclosure. Specifically, the example algorithm 300 includes a torque capability determination block 302 configured to determine a limited command torque $T_{CmdLmtd}$.

The torque capability determination block 302 includes an inverter/motor current limit block 304 configured to determine a current-based torque limit $T_i^{pk}$ based on a motor current limit $I_i^{lim}$. The motor current limit $I_i^{lim}$ may be a lesser one of a current value that the inverter 216 and/or the motor (e.g., the PMSM 19) is rated to handle. Alternatively or additionally, the motor current limit $I_i^{lim}$ may be based on a current rating of only the motor (e.g., the PMSM 19) or the inverter 216. For example, where the current rating of the inverter 216 or the PMSM 19 is known not to be a limiting factor (e.g. where the inverter 216 has a current rating significantly higher than a current rating of the motor).

The torque capability determination block 302 also includes a voltage limit block 306 configured to determine a voltage-based torque limit $T_v^{pk}$ based on a voltage constraint $V_{DC}$ of the DC bus 215. The voltage constraint $V_{DC}$ may include a highest voltage that the DC bus 215 is rated to operate. Alternatively or additionally, the voltage constraint $V_{DC}$ may include a voltage that the DC bus 215 is rated to operate. Operation of the DC bus 215 with a voltage outside of the voltage constraint $V_{DC}$ may have adverse results, such as equipment failure and/or damage to hardware connected to the DC bus 215.

The torque capability determination block 302 also includes a torque limit arbitration block 308 configured to determine a final torque limit $T_{pk}$ based on the current-based torque limit $T_i^{pk}$ and the voltage-based torque limit $T_v^{pk}$.

The torque capability determination block 302 also includes a torque command limiting block 310, which determines a limited command torque $T_{CmdLmtd}$ based on a commanded torque $T_c$ and the final torque limit $T_{pk}$ from the torque limit arbitration block 308. The torque command limiting block 310 may be configured to set the limited command torque $T_{CmdLmtd}$ to a lesser of the commanded torque $T_{Cmd}$ and the final torque limit $T_{pk}$.

The example algorithm 300 also includes a current command calculation block 320 configured to determine d-axis and q-axis current commands $I^*_{dq}$ for controlling operation of the inverter 216. The current command calculation block 320 includes a maximum torque per ampere block 322, which may determine preliminary motor current values $I_{dq}^{mtpa}$ based on the limited command torque $T_{CmdLmtd}$. The preliminary motor current values $I_{dq}^{mtpa}$ may be optimized based on a maximum torque per ampere determination, which may include performing one or more calculations and/or other methods. The optimized motor current values $I_{dq}^{mtpa}$ may include a preliminary d-axis current $I_d^{mtpa}$ and a preliminary q-axis current $I_q^{mtpa}$. The current command calculation block 320 also includes a maximum torque per voltage block 324, which may be configured to determine the d-axis and q-axis current commands $I^*_{dq}$ to cause the PMSM 19 to produce a maximum torque which satisfies the limited command torque $T_{CmdLmtd}$ and which is optimized for voltage.

A mathematical expression used to determine the torque limit while satisfying both the motor current limit $I_i^{lim}$, and a voltage constraint $V_{DC}$ of the DC bus 215 may include the following equations:

$$V_d = RI_d + \omega_e L_q I_q \quad (1)$$

$$V_q = RI_q + K_e \omega_m - \omega_e L_d I_d \quad (2)$$

$$V_d^2 + V_q^2 \leq V_{DC}^2/3 \quad (3)$$

$$I_d^2 + I_q^2 \leq I_{ilim}^2 \quad (4)$$

$$T_e = 3/2 K_e I_q + 3/4 N_p (L_q - L_d) I_d I_q \quad (5)$$

FIGS. 5A-5D show graphs generally illustrating four different $I_d, I_q$ trajectories to search for a maximum torque for satisfying DC bus voltage and motor current limit constraints, according to the principles of the present disclosure.

Figure 5A:
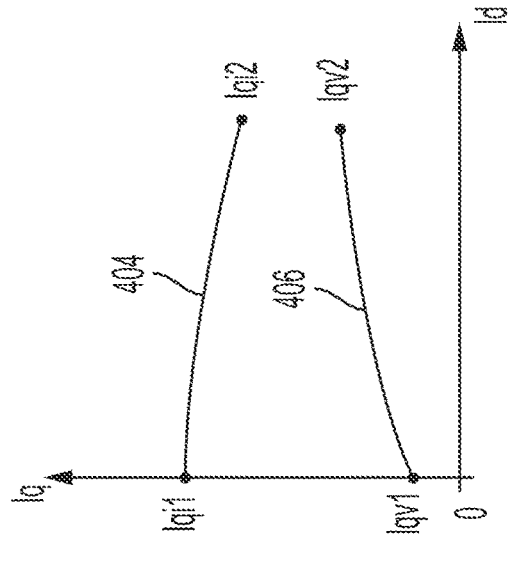
FIGS. 5A-5D show graphs generally illustrating four different $I_d, I_q$ trajectories to search for a maximum torque satisfying DC bus voltage and inverter/motor current limit constraints, according to the principles of the present disclosure.

Specifically, FIG. 5A includes a first plot 400 showing d-axis current and q-axis current $I_d, I_q$ calculated to satisfy the motor current limit $I_i^{lim}$. The first plot 400 extends between a first motor current-based q-axis current $I_{qi1}$ where the d-axis current $I_d$ is equal to a predetermined minimum value, and a second motor current-based q-axis current $I_{qi2}$ where the d-axis current $I_d$ is equal to a predetermined maximum value. The predetermined minimum value may be, for example, zero or a positive or negative value that is less than the predetermined maximum value. FIG. 5A also includes a second plot 402 showing d-axis current and q-axis current $I_d, I_q$ calculated to satisfy the voltage constraint $V_{DC}$ of the DC bus 215. The second plot 402 extends between a first voltage limit-based q-axis current $I_{qv1}$ where the d-axis current $I_d$ is equal to the predetermined minimum value, and a second voltage limit-based q-axis current $I_{qv2}$ where the d-axis current $I_d$ is equal to the predetermined maximum value.

FIG. 5A illustrates a case in which the plots 400, 402 both have positive q-axis current $I_q$ values for all d-axis current $I_d$ values, and where the first plot 400 always has a q-axis current $I_q$ value that is lower than the corresponding q-axis current $I_q$ value of the second plot 402. Thus, in this case, the torque limit arbitration block 308 may set the final torque limit $T_{pk}$ equal to the current-based torque limit $T_i^{pk}$.

Figure 5B:
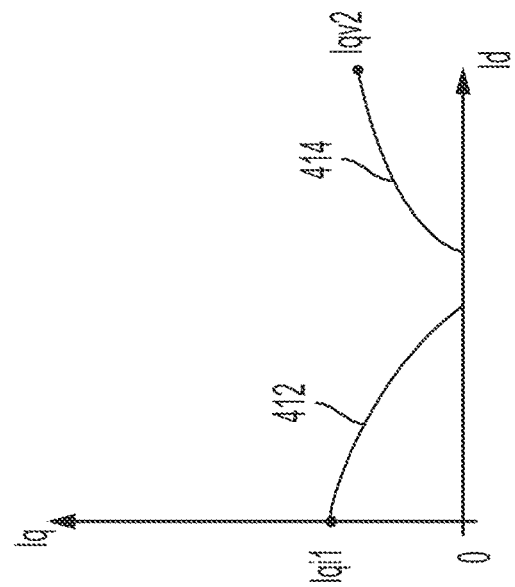

FIG. 5B includes a first plot 404 showing d-axis current and q-axis current $I_d, I_q$ calculated to satisfy the motor current limit $I_i^{lim}$. The first plot 404 extends between a first motor current-based q-axis current $I_{qi1}$ where the d-axis current $I_d$ is equal to the predetermined minimum value, and a second motor current-based q-axis current $I_{qi2}$ where the d-axis current $I_d$ is equal to a predetermined maximum value. FIG. 5B also includes a second plot 406 showing d-axis current and q-axis current $I_d, I_q$ calculated to satisfy the voltage constraint $V_{DC}$ of the DC bus 215. The second plot 406 extends between a first voltage limit-based q-axis current $I_{qv1}$ where the d-axis current $I_d$ is equal to the predetermined minimum value, and a second voltage limit-based q-axis current $I_{qv2}$ where the d-axis current $I_d$ is equal to the predetermined maximum value.

FIG. 5B illustrates a case in which the plots 404, 406 both have positive q-axis current $I_q$ values for all d-axis current $I_d$ values, and where the second plot 406 always has a q-axis current $I_q$ value that is lower than the corresponding q-axis current $I_q$ value of the first plot 404. Thus, in this case, the torque limit arbitration block 308 may set the final torque limit $T_{pk}$ equal to the voltage-based torque limit $T_v^{pk}$.

Figure 5C:
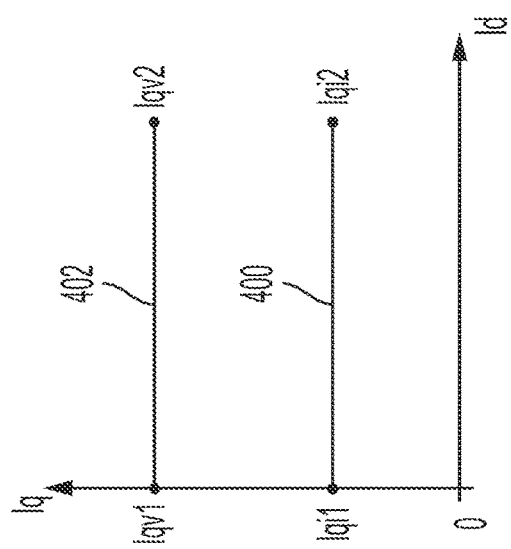

FIG. 5C includes a first plot 408 showing d-axis current and q-axis current $I_d, I_q$ calculated to satisfy the motor current limit $I_i^{lim}$. The first plot 408 extends between a first motor current-based q-axis current $I_{qi1}$ where the d-axis current $I_d$ is equal to the predetermined minimum value, and a second motor current-based q-axis current $I_{qi2}$ where the d-axis current $I_d$ is equal to a predetermined maximum value. FIG. 5C also includes a second plot 410 showing d-axis current and q-axis current $I_d, I_q$ calculated to satisfy the voltage constraint $V_{DC}$ of the DC bus 215. The second plot 410 extends between a first voltage limit-based q-axis current $I_{qv1}$ where the d-axis current $I_d$ is equal to the predetermined minimum value, and a second voltage limit-based q-axis current $I_{qv2}$ where the d-axis current $I_d$ is equal to the predetermined maximum value.

FIG. 5C illustrates a case in which the plots 408, 410 intersect each other in the illustrated region (positive values of both $I_d, I_q$). So, in the case where the current based curve and voltage based curve are intersecting, the final torque limit $T_{pk}$ should be determined based on the intersection point of the curves represented by the plots 408,410. For example, the controller 16 may determine a d-axis intersection current value $I_{d\_int}$ where a q-axis current corresponding to the motor current limit $I_i^{lim}$ is equal to a q-axis current corresponding to the voltage constraint $V_{DC}$ of the DC bus 215 (i.e. where plots 408, 410 intersect). The controller 16 may determine the final torque limit $T_{pk}$ based on the d-axis intersection current value $I_{d\_int}$. For example, the controller 16 may determine a corresponding q-axis intersection current value $I_{q\_int}$ that satisfies both a voltage equation for satisfying the voltage constraint $V_{DC}$ of the DC bus 215, and a current equation for satisfying the motor current limit $I_i^{lim}$. The voltage equation may include equation (3), above; and the current equation may include equation (4), above. This corresponding q-axis intersection current value $I_{q\_int}$ is shown graphically on FIG. 5C. The controller 16 may then determine the final torque limit $T_{pk}$ based on the d-axis intersection current value $I_{d\_int}$ and the q-axis intersection current value $I_{q\_int}$. For example, the controller 16 may calculate the final torque limit $T_{pk}$ by plugging-in the d-axis intersection current value $I_{d\_int}$ and the q-axis intersection current value $I_{q\_int}$ to a torque equation for computing a torque based on d-axis and q-axis currents. The torque equation may include equation (5), above.

Figure 5D:
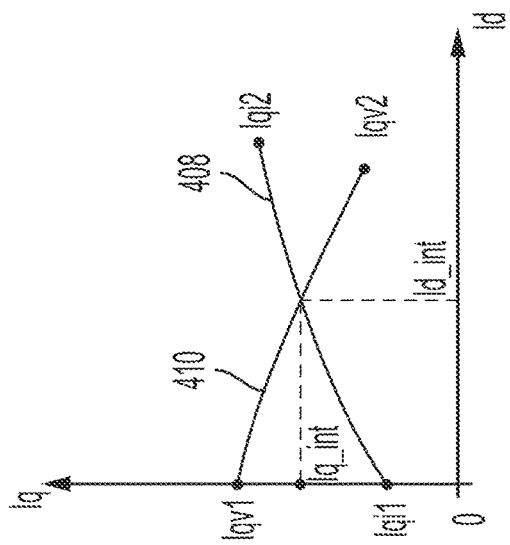

FIG. 5D includes a first plot 412 showing d-axis current and q-axis current $I_d, I_q$ calculated to satisfy the motor current limit $I_{ilim}$. The first plot 412 extends between a first motor current-based q-axis current $I_{qi1}$ where the d-axis current $I_d$ is equal to the predetermined minimum value, and a second, negative, motor current-based q-axis current where the d-axis current $I_d$ is equal to the predetermined maximum value (not shown on the graph). FIG. 5D also includes a second plot 414 showing d-axis current and q-axis current $I_d, I_q$ calculated to satisfy the voltage constraint $V_{DC}$ of the DC bus 215. The second plot 414 extends between a first voltage limit-based q-axis current where the d-axis current $I_d$ is equal to the predetermined minimum value, and a second voltage limit-based q-axis current $I_{qv2}$ where the d-axis current $I_d$ is equal to the predetermined maximum value. The first voltage-limit-based q-axis current has a negative value and is not shown on the graph.

FIG. 5D illustrates a case in which there are no positive values of the q-axis current $I_q$ that are less than or equal to the q-axis current $I_q$ value of each of the plots 412, 414 for any d-axis current $I_d$ value. Thus, in this case, the torque limit arbitration block 308 may set the final torque limit $T_{pk}$ equal to zero (0). In other words, the final torque limit $T_{pk}$ may be set to zero in cases where there is no direct relationship between the two curves represented by the plots 412, 414.

Figure 6:
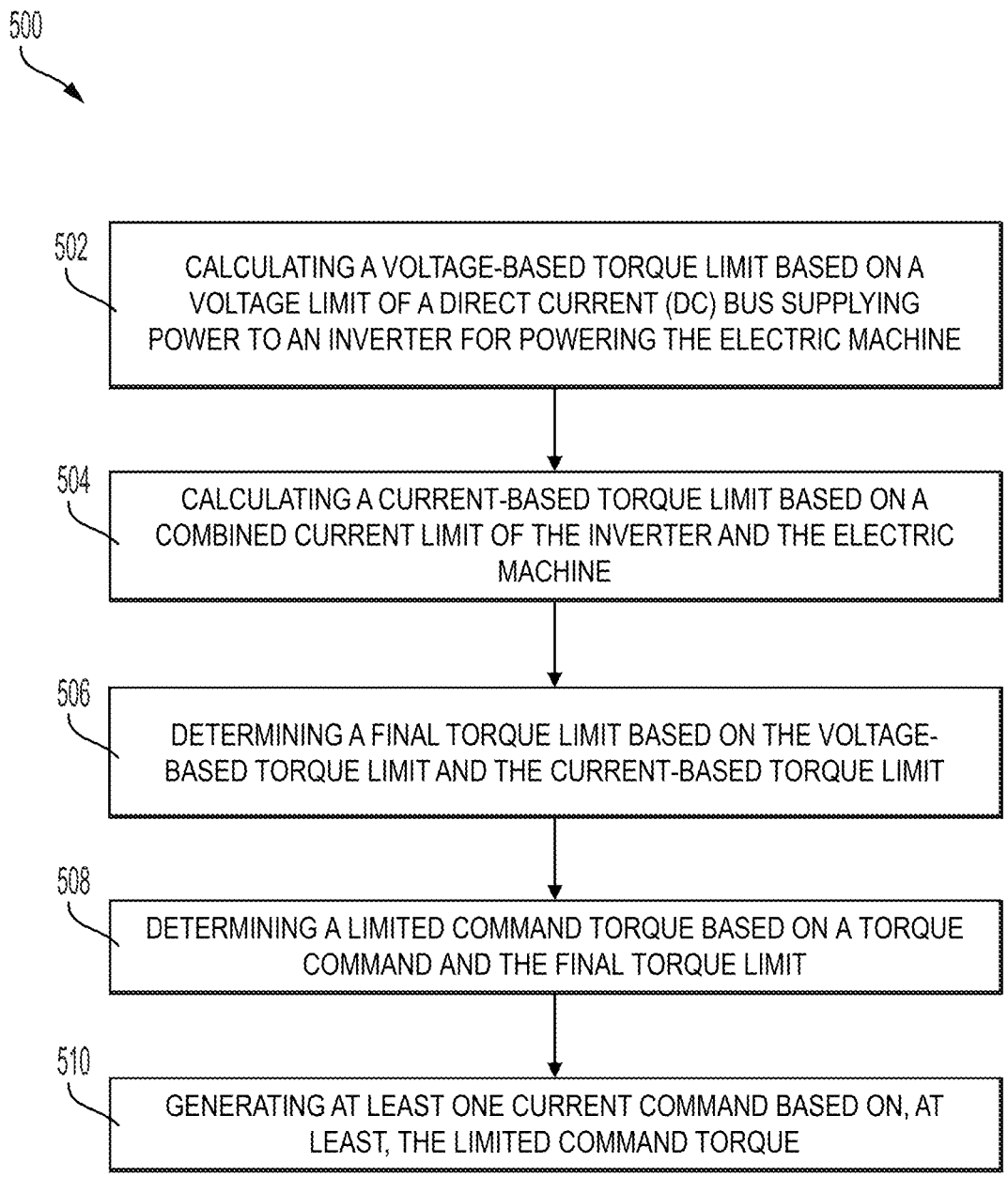
FIG. 6 is a flow diagram generally illustrating a method of controlling operation of an electric machine, according to principles of the present disclosure.

FIG. 6 is a flow diagram generally illustrating a method 500 of controlling operation of an electric machine. At 502, the method 500 calculates a voltage-based torque limit based on a voltage constraint of a direct current (DC) bus supplying power to an inverter for powering the electric machine. For example, the processor 102 may execute instructions implementing the voltage limit block 306 to determine the voltage-based torque limit $T_v^{pk}$ based on the voltage constraint $V_{DC}$ of the DC bus 215.

At 504, the method 500 calculates a current-based torque limit based on a motor current limit. For example, the processor 102 may execute instructions implementing the inverter/motor current limit block 304 to determine the current-based torque limit $T_i^{pk}$ based on the motor current limit $I_i^{lim}$.

At 506, the method 500 determines a final torque limit $T^{pk}$ based on the voltage-based torque limit $T_v^{pk}$ and the current-based torque limit $T_i^{pk}$. In some embodiments, determining the final torque limit $T^{pk}$ includes arbitrating between the voltage-based torque limit $T_v^{pk}$ and the current-based torque limit $T_i^{pk}$. For example, the processor 102 may execute instructions implementing the torque limit arbitration block 308 to determine the final torque limit $T_{pk}$ based on the current-based torque limit $T_i^{pk}$ and the voltage-based torque limit $T_v^{pk}$, which are each based on a corresponding one of the current limit of the electric machine 19 and inverter combination $I_i^{lim}$, and the voltage constraint $V_{DC}$ of the DC bus 215. The current limit of the electric machine 19 and inverter combination $I_i^{lim}$ may also be called the motor current limit $I_i^{lim}$.

In some embodiments, arbitrating between the voltage-based torque limit $T_v^{pk}$ and the current-based torque limit $T_i^{pk}$ includes determining a first motor current-based q-axis current $I_{qi1}$ corresponding to a d-axis current $I_d$ having a predetermined minimum value, such as zero, and corresponding to the motor current limit $I_i^{lim}$. Arbitrating between the voltage-based torque limit $T_v^{pk}$ and the current-based torque limit $T_i^{pk}$ may also include determining a second motor current-based q-axis current $I_{qi2}$ corresponding to the d-axis current $I_d$ having a predetermined maximum value and corresponding to the motor current limit $I_i^{lim}$. Arbitrating between the voltage-based torque limit $T_v^{pk}$ and the current-based torque limit $T_i^{pk}$ may also include determining a first voltage limit-based q-axis current $I_{qv1}$ corresponding to a d-axis current $I_d$ having a predetermined minimum value and corresponding to the voltage constraint $V_{DC}$ of the DC bus 215. Arbitrating between the voltage-based torque limit $T_v^{pk}$ and the current-based torque limit $T_i^{pk}$ may also include determining a second voltage limit-based q-axis current $I_{qv2}$ corresponding to the d-axis current $I_d$ having a predetermined maximum value and corresponding to the voltage constraint $V_{DC}$ of the DC bus 215.

Arbitrating between the voltage-based torque limit $T_v^{pk}$ and the current-based torque limit $T_i^{pk}$ may also include determining one of the first motor current-based q-axis current $I_{qi1}$ and the first voltage limit-based q-axis current $I_{qv1}$ having a lesser value; and determining one of the second motor current-based q-axis current $I_{qi2}$ and the second voltage limit-based q-axis current $I_{qv2}$ having a lesser value. Arbitrating between the voltage-based torque limit $T_v^{pk}$ and the current-based torque limit $T_i^{pk}$ may also include selecting one of the current-based torque limit $T_i^{pk}$ and the voltage-based torque limit $T_v^{pk}$ based on the one of the first motor current-based q-axis current $I_{qi1}$ and the first voltage limit-based q-axis current $I_{qv1}$ having the lesser value and based on the one of the second motor current-based q-axis current $I_{qi2}$ and the second voltage limit-based q-axis current $I_{qv2}$ having the lesser value $I_{qv2}$.

In some embodiments, selecting the one of the current-based torque limit $T_i^{pk}$ and the voltage-based torque $T_v^{pk}$ limit further comprises selecting the current-based torque limit $T_i^{pk}$ as the final torque limit $T^{pk}$ in response to determining the first motor current-based q-axis current $I_{qi1}$ being less than the first voltage limit-based q-axis current $I_{qv1}$, and the second motor current-based q-axis current $I_{qi2}$ being less than the second voltage limit-based q-axis current $I_{qv2}$. An example of such a situation is shown in FIG. 5A.

In some embodiments, selecting the one of the current-based torque limit $T_i^{pk}$ and the voltage-based torque $T_v^{pk}$ limit further comprises selecting the voltage-based torque limit $T_v^{pk}$ as the final torque limit $T^{pk}$ in response to determining the first voltage limit-based q-axis current $I_{qv1}$ being less than the first motor current-based q-axis current $I_{qi1}$, and the second voltage limit-based q-axis current $I_{qv2}$ being less than the second motor current-based q-axis current $I_{qi2}$. An example of such a situation is shown in FIG. 5B.

In some embodiments, arbitrating between the voltage-based torque limit $T_v^{pk}$ and the current-based torque limit $T_i^{pk}$ includes determining a first motor current-based q-axis current $I_{qi1}$ corresponding to a d-axis current $I_d$ having a predetermined minimum value, such as zero, and corresponding to the motor current limit $I_i^{lim}$. Arbitrating between the voltage-based torque limit $T_v^{pk}$ and the current-based torque limit $T_i^{pk}$ may also include determining a second motor current-based q-axis current $I_{qi2}$ corresponding to the d-axis current $I_d$ having a predetermined maximum value and corresponding to the motor current limit $I_i^{lim}$. Arbitrating between the voltage-based torque limit $T_v^{pk}$ and the current-based torque limit $T_i^{pk}$ may also include determining a first voltage limit-based q-axis current $I_{qv1}$ corresponding to a d-axis current $I_d$ having a predetermined minimum value and corresponding to the voltage constraint $V_{DC}$ of the DC bus 215. Arbitrating between the voltage-based torque limit $T_v^{pk}$ and the current-based torque limit $T_i^{pk}$ may also include determining a second voltage limit-based q-axis current $I_{qv2}$ corresponding to the d-axis current $I_d$ having a predetermined maximum value and corresponding to the voltage constraint $V_{DC}$ of the DC bus 215.

Arbitrating between the voltage-based torque limit $T_v^{pk}$ and the current-based torque limit $T_i^{pk}$ may also include determining one of the first motor current-based q-axis current $I_{qi1}$ and the first voltage limit-based q-axis current $I_{qv1}$ having a lesser value; and determining one of the second motor current-based q-axis current $I_{qi2}$ and the second voltage limit-based q-axis current $I_{qv2}$ having a lesser value. Arbitrating between the voltage-based torque limit $T_v^{pk}$ and the current-based torque limit $T_i^{pk}$ may also include determining the one of the second motor current-based q-axis current $I_{qi2}$ and the second voltage limit-based q-axis current $I_{qv2}$ having the lesser value corresponding to a different constraint from the one of the first motor current-based q-axis current $I_{qi1}$ and the first voltage limit-based q-axis current $I_{qv1}$ having the lesser value. An example of such a situation is shown in FIG. 5C, in which the second voltage limit-based q-axis current $I_{qv2}$ (which is associated with the voltage constraint $V_{DC}$ of the DC bus 215) has a lesser value than the second motor current-based q-axis current $I_{qi2}$, and the first motor current-based q-axis current $I_{qi1}$ (which is associated with the motor current limit $I_i^{lim}$) has a lesser value than the first voltage limit-based q-axis current $I_{qv1}$. A similar result, including intersecting plots, may result if the endpoints were swapped.

In some embodiments, the method 500 may further include determining a d-axis intersection current value $I_{d\_int}$ where a q-axis current corresponding to the motor current limit $I_i^{lim}$ is equal to a q-axis current corresponding to the voltage constraint $V_{DC}$ of the DC bus 215.

In some embodiments, the method 500 may further include determining the final torque limit $T_{pk}$ based on the d-axis intersection current value $I_{d\_int}$ and based on the q-axis current $I_q$ corresponding to each of motor current limit $I_i^{lim}$ and the voltage constraint $V_{DC}$ of the DC bus 215. For example, the controller 16 may determine a corresponding q-axis intersection current value $I_{q\_int}$ that satisfies both a voltage equation for satisfying the voltage constraint $V_{DC}$ of the DC bus 215, and a current equation for satisfying the motor current limit $I_i^{lim}$. The voltage equation may include equation (3), above; and the current equation may include equation (4), above. The controller 16 may then determine the final torque limit $T_{pk}$ based on the d-axis intersection current value $I_{d\_int}$ and the q-axis intersection current value $I_{q\_int}$. For example, the controller 16 may calculate the final torque limit $T_{pk}$ by plugging-in the d-axis intersection current value $I_{d\_int}$ and the q-axis intersection current value $I_{q\_int}$ to a torque equation for computing a torque based on d-axis and q-axis currents. The torque equation may include equation (5), above.

At 508, the method 500 determines a limited command torque based on a torque command and the final torque limit. For example, the processor 102 may execute instructions implementing the torque command limiting block 310 to determine the limited command torque $T_{CmdLmtd}$ based on the commanded torque $T_c$ and the final torque limit $T_p k$. More specifically, the torque command limiting block 310 may set the limited command torque $T_{CmdLmtd}$ as the commanded torque $T_c$, limited not to exceed the final torque limit $T_{pk}$.

At 510, the method 500 generates at least one current command based on, at least, the limited command torque. For example, the processor 102 may execute instructions implementing the current command calculation block 320 to determine d-axis and q-axis current commands $I^*_{dq}$ for controlling operation of the inverter 216. More specifically, the current command calculation block 320 may calculate the d-axis and q-axis current commands $I^*_{dq}$ based on the limited command torque $T_{CmdLmtd}$ using on a maximum torque per ampere determination to optimize the current commands for torque production and/or a maximum torque per voltage determination to optimize the current commands for voltage to be applied to the electric machine 19.

In some embodiments, generating the at least one current command includes determining at least one preliminary motor current value $I_{dq}^{mtpa}$ which would cause the electric machine 19 to produce the limited command torque $T_{CmdLmtd}$ using least amount of current. This determination may be performed by the maximum torque per ampere block 322.

In some embodiments, generating the at least one current command includes determining the at least one current command based on the at least one preliminary motor current value $I_{dq}^{mtpa}$, and corresponding to a supply voltage of the DC bus 215 and to the voltage constraint $V_{DC}$ of the DC bus 215 and which would cause the electric machine 19 to produce the limited command torque $T_{CmdLmtd}$. This determination may be performed by the maximum torque per voltage block 324.

According to an aspect of the disclosure, a method of controlling operation of an electric machine is provided. The method includes: calculating a voltage-based torque limit based on a voltage constraint of a direct current (DC) bus supplying power to an inverter for powering the electric machine; calculating a current-based torque limit based on a motor current limit; determining a final torque limit based on the voltage-based torque limit and the current-based torque limit; determining a limited command torque based on a torque command and the final torque limit; and generating at least one current command based on, at least, the limited command torque.

According to an aspect of the disclosure, the method of controlling operation of the electric machine may further include selectively controlling a plurality of switches within the inverter to cause the inverter to supply a current to the electric machine based on the at least one current command.

According to an aspect of the disclosure, the motor current limit may be a lesser one of a current limit of the inverter and a current limit of the electric machine.

According to an aspect of the disclosure, determining the final torque limit may further include arbitrating between the voltage-based torque limit and the current-based torque limit.

According to an aspect of the disclosure, arbitrating between the voltage-based torque limit and the current-based torque limit may further comprise: determining a first motor current-based q-axis current corresponding to a d-axis current having a predetermined minimum value and corresponding to the motor current limit; determining a second motor current-based q-axis current corresponding to the d-axis current having a predetermined maximum value and corresponding to the motor current limit; determining a first voltage limit-based q-axis current corresponding to a d-axis current having a predetermined minimum value and corresponding to the voltage constraint of the DC bus; determining a second voltage limit-based q-axis current corresponding to the d-axis current having a predetermined maximum value and corresponding to the voltage constraint of the DC bus; determining one of the first motor current-based q-axis current and the first voltage limit-based q-axis current having a lesser value; determining one of the second motor current-based q-axis current and the second voltage limit-based q-axis current having a lesser value; and selecting one of the current-based torque limit and the voltage-based torque limit based on the one of the first motor current-based q-axis current and the first voltage limit-based q-axis current having the lesser value and based on the one of the second motor current-based q-axis current and the second voltage limit-based q-axis current having the lesser value.

According to an aspect of the disclosure, selecting the one of the current-based torque limit and the voltage-based torque limit may further comprise: selecting the current-based torque limit as the final torque limit in response to determining the first motor current-based q-axis current being less than the first voltage limit-based q-axis current, and the second motor current-based q-axis current being less than the second voltage limit-based q-axis current; and selecting the voltage-based torque limit as the final torque limit in response to determining the first voltage limit-based q-axis current being less than the first motor current-based q-axis current, and the second voltage limit-based q-axis current being less than the second motor current-based q-axis current.

According to an aspect of the disclosure, arbitrating between the voltage-based torque limit and the current-based torque limit may further comprise: determining a first motor current-based q-axis current corresponding to a d-axis current having a predetermined minimum value and corresponding to the motor current limit; determining a second motor current-based q-axis current corresponding to the d-axis current having a predetermined maximum value and corresponding to the motor current limit; determining a first voltage limit-based q-axis current corresponding to a d-axis current having a predetermined minimum value and corresponding to the voltage constraint of the DC bus; determining a second voltage limit-based q-axis current corresponding to the d-axis current having a predetermined maximum value and corresponding to the voltage constraint of the DC bus; determining one of the first motor current-based q-axis current and the first voltage limit-based q-axis current having a lesser value; determining one of the second motor current-based q-axis current and the second voltage limit-based q-axis current having a lesser value; determining the one of the second motor current-based q-axis current and the second voltage limit-based q-axis current having the lesser value corresponding to a different constraint from the one of the first motor current-based q-axis current and the first voltage limit-based q-axis current having the lesser value; determining a d-axis intersection current value where a q-axis current corresponding to the motor current limit is equal to a q-axis current corresponding to the voltage constraint of the DC bus; and determining the final torque limit based on the d-axis intersection current value.

According to an aspect of the disclosure, generating the at least one current command may further include determining the at least one current command based on the at least one preliminary motor current value, and corresponding to a supply voltage of the DC bus and to the voltage constraint of the DC bus and which would cause the electric machine to produce the limited command torque.

According to an aspect of the disclosure, a control system for controlling operation of an electric machine includes a processor and a memory. The memory includes instructions that, when executed by the processor, cause the processor to: calculate a voltage-based torque limit based on a voltage constraint of a direct current (DC) bus supplying power to an inverter for powering the electric machine; calculate a current-based torque limit based on a motor current limit; determine a final torque limit based on the voltage-based torque limit and the current-based torque limit; determine a limited command torque based on a torque command and the final torque limit; and generate at least one current command based on, at least, the limited command torque.

According to an aspect of the disclosure, the instructions may further cause the processor to selectively control a plurality of switches within the inverter to cause the inverter to supply a current to the electric machine based on the at least one current command.

According to an aspect of the disclosure, the motor current limit may be a lesser one of a current limit of the inverter and a current limit of the electric machine.

According to an aspect of the disclosure, determining the final torque limit may further include arbitrating between the voltage-based torque limit and the current-based torque limit.

According to an aspect of the disclosure, arbitrating between the voltage-based torque limit and the current-based torque limit may further comprise the instructions causing the processor to: determine a first motor current-based q-axis current corresponding to a d-axis current having a predetermined minimum value and corresponding to the motor current limit; determine a second motor current-based q-axis current corresponding to the d-axis current having a predetermined maximum value and corresponding to the motor current limit; determine a first voltage limit-based q-axis current corresponding to a d-axis current having a predetermined minimum value and corresponding to the voltage constraint of the DC bus; determine a second voltage limit-based q-axis current corresponding to the d-axis current having a predetermined maximum value and corresponding to the voltage constraint of the DC bus;

determine one of the first motor current-based q-axis current and the first voltage limit-based q-axis current having a lesser value; determine one of the second motor current-based q-axis current and the second voltage limit-based q-axis current having a lesser value; and select one of the current-based torque limit and the voltage-based torque limit based on the one of the first motor current-based q-axis current and the first voltage limit-based q-axis current having the lesser value and based on the one of the second motor current-based q-axis current and the second voltage limit-based q-axis current having the lesser value.

According to an aspect of the disclosure, selecting the one of the current-based torque limit and the voltage-based torque limit may further comprise the instructions causing the processor to: select the current-based torque limit as the final torque limit in response to determining the first motor current-based q-axis current being less than the first voltage limit-based q-axis current, and the second motor current-based q-axis current being less than the second voltage limit-based q-axis current; and select the voltage-based torque limit as the final torque limit in response to determining the first voltage limit-based q-axis current being less than the first motor current-based q-axis current, and the second voltage limit-based q-axis current being less than the second motor current-based q-axis current.

According to an aspect of the disclosure, arbitrating between the voltage-based torque limit and the current-based torque limit may further comprise the instructions causing the processor to: determine a first motor current-based q-axis current corresponding to a d-axis current having a predetermined minimum value and corresponding to the motor current limit; determine a second motor current-based q-axis current corresponding to the d-axis current having a predetermined maximum value and corresponding to the motor current limit; determine a first voltage limit-based q-axis current corresponding to a d-axis current having a predetermined minimum value and corresponding to the voltage constraint of the DC bus; determine a second voltage limit-based q-axis current corresponding to the d-axis current having a predetermined maximum value and corresponding to the voltage constraint of the DC bus; determine one of the first motor current-based q-axis current and the first voltage limit-based q-axis current having a lesser value; determine one of the second motor current-based q-axis current and the second voltage limit-based q-axis current having a lesser value; determine the one of the second motor current-based q-axis current and the second voltage limit-based q-axis current having the lesser value corresponding to a different constraint from the one of the first motor current-based q-axis current and the first voltage limit-based q-axis current having the lesser value; determine a d-axis intersection current value where a q-axis current corresponding to the motor current limit is equal to a q-axis current corresponding to the voltage constraint of the DC bus; and determine the final torque limit based on the d-axis intersection current value and based on the q-axis current corresponding to each of motor current limit and the voltage constraint of the DC bus.

According to an aspect of the disclosure, generating the at least one current command may further include determining the at least one current command based on the at least one preliminary motor current value, and corresponding to a supply voltage of the DC bus and to the voltage constraint of the DC bus and which would cause the electric machine to produce the limited command torque.

According to an aspect of the disclosure, a control system for controlling operation of an electric machine includes an inverter having a plurality of switches operable to supply an alternating current to the electric machine. The control system also includes a controller operable to: calculate a voltage-based torque limit based on a voltage constraint of a direct current (DC) bus supplying power to an inverter for powering the electric machine; calculate a current-based torque limit based on a motor current limit; determine a final torque limit based on the voltage-based torque limit and the current-based torque limit; determine a limited command torque based on a torque command and the final torque limit; generate at least one current command based on, at least, the limited command torque; and selectively control the plurality of switches within the inverter to cause the inverter to supply the alternating current to the electric machine based on the at least one current command.

According to an aspect of the disclosure, determining the final torque limit may include arbitrating between the voltage-based torque limit and the current-based torque limit.

According to an aspect of the disclosure, arbitrating between the voltage-based torque limit and the current-based torque limit may further comprise the controller being operable to: determine a first motor current-based q-axis current corresponding to a d-axis current having a predetermined minimum value and corresponding to the motor current limit; determine a second motor current-based q-axis current corresponding to the d-axis current having a predetermined maximum value and corresponding to the motor current limit; determine a first voltage limit-based q-axis current corresponding to a d-axis current having a predetermined minimum value and corresponding to the voltage constraint of the DC bus; determine a second voltage limit-based q-axis current corresponding to the d-axis current having a predetermined maximum value and corresponding to the voltage constraint of the DC bus; determine one of the first motor current-based q-axis current and the first voltage limit-based q-axis current having a lesser value; determine one of the second motor current-based q-axis current and the second voltage limit-based q-axis current having a lesser value; and select one of the current-based torque limit and the voltage-based torque limit based on the one of the first motor current-based q-axis current and the first voltage limit-based q-axis current having the lesser value and based on the one of the second motor current-based q-axis current and the second voltage limit-based q-axis current having the lesser value.

According to an aspect of the disclosure, selecting the one of the current-based torque limit and the voltage-based torque limit may further comprise the controller being operable to: select the current-based torque limit as the final torque limit in response to determining the first motor current-based q-axis current being less than the first voltage limit-based q-axis current, and the second motor current-based q-axis current being less than the second voltage limit-based q-axis current; and select the voltage-based torque limit as the final torque limit in response to determining the first voltage limit-based q-axis current being less than the first motor current-based q-axis current, and the second voltage limit-based q-axis current being less than the second motor current-based q-axis current.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A method of controlling operation of an electric machine, comprising:
    calculating a voltage-based torque limit based on a voltage constraint of a direct current (DC) bus supplying power to an inverter for powering the electric machine;
    calculating a current-based torque limit based on a motor current limit;
    determining a final torque limit based on the voltage-based torque limit and the current-based torque limit;
    determining a limited command torque based on a torque command and the final torque limit; and
    generating at least one current command based on, at least, the limited command torque.

2. The method of claim 1, further comprising selectively controlling a plurality of switches within the inverter to cause the inverter to supply a current to the electric machine based on the at least one current command.

3. The method of claim 1, wherein the motor current limit is a lesser one of a current limit of the inverter and a current limit of the electric machine.

4. The method of claim 1, wherein determining the final torque limit further comprises arbitrating between the voltage-based torque limit and the current-based torque limit.

5. The method of claim 4, wherein arbitrating between the voltage-based torque limit and the current-based torque limit further comprises:
    determining a first motor current-based q-axis current corresponding to a d-axis current having a predetermined minimum value and corresponding to the motor current limit;
    determining a second motor current-based q-axis current corresponding to the d-axis current having a predetermined maximum value and corresponding to the motor current limit;
    determining a first voltage limit-based q-axis current corresponding to a d-axis current having a predetermined minimum value and corresponding to the voltage constraint of the DC bus;
    determining a second voltage limit-based q-axis current corresponding to the d-axis current having a predetermined maximum value and corresponding to the voltage constraint of the DC bus;
    determining one of the first motor current-based q-axis current and the first voltage limit-based q-axis current having a lesser value;
    determining one of the second motor current-based q-axis current and the second voltage limit-based q-axis current having a lesser value; and
    selecting one of the current-based torque limit and the voltage-based torque limit based on the one of the first motor current-based q-axis current and the first voltage limit-based q-axis current having the lesser value and based on the one of the second motor current-based q-axis current and the second voltage limit-based q-axis current having the lesser value.

6. The method of claim 5, wherein selecting the one of the current-based torque limit and the voltage-based torque limit further comprises:

selecting the current-based torque limit as the final torque limit in response to determining the first motor current-based q-axis current being less than the first voltage limit-based q-axis current, and the second motor current-based q-axis current being less than the second voltage limit-based q-axis current; and selecting the voltage-based torque limit as the final torque limit in response to determining the first voltage limit-based q-axis current being less than the first motor current-based q-axis current, and the second voltage limit-based q-axis current being less than the second motor current-based q-axis current.

7. The method of claim 4, wherein arbitrating between the voltage-based torque limit and the current-based torque limit further comprises:

determining a first motor current-based q-axis current corresponding to a d-axis current having a predetermined minimum value and corresponding to the motor current limit;

determining a second motor current-based q-axis current corresponding to the d-axis current having a predetermined maximum value and corresponding to the motor current limit;

determining a first voltage limit-based q-axis current corresponding to a d-axis current having a predetermined minimum value and corresponding to the voltage constraint of the DC bus;

determining a second voltage limit-based q-axis current corresponding to the d-axis current having a predetermined maximum value and corresponding to the voltage constraint of the DC bus;

determining one of the first motor current-based q-axis current and the first voltage limit-based q-axis current having a lesser value;

determining one of the second motor current-based q-axis current and the second voltage limit-based q-axis current having a lesser value;

determining the one of the second motor current-based q-axis current and the second voltage limit-based q-axis current having the lesser value corresponding to a different constraint from the one of the first motor current-based q-axis current and the first voltage limit-based q-axis current having the lesser value;

determining a d-axis intersection current value where a q-axis current corresponding to the motor current limit is equal to a q-axis current corresponding to the voltage constraint of the DC bus; and determining the final torque limit based on the d-axis intersection current value and based on the q-axis current corresponding to each of motor current limit and the voltage constraint of the DC bus.

8. The method of claim 1, wherein generating the at least one current command further comprises determining the at least one current command based on the at least one preliminary motor current value, and corresponding to a supply voltage of the DC bus and to the voltage constraint of the DC bus and which would cause the electric machine to produce the limited command torque.

9. A control system for controlling operation of an electric machine, comprising:

a processor; and a memory that includes instructions that, when executed by the processor, cause the processor to:

calculate a voltage-based torque limit based on a voltage constraint of a direct current (DC) bus supplying power to an inverter for powering the electric machine;

calculate a current-based torque limit based on a motor current limit;

determine a final torque limit based on the voltage-based torque limit and the current-based torque limit;

determine a limited command torque based on a torque command and the final torque limit; and generate at least one current command based on, at least, the limited command torque.

10. The control system of claim 9, wherein the instructions further cause the processor to selectively control a plurality of switches within the inverter to cause the inverter to supply a current to the electric machine based on the at least one current command.

11. The control system of claim 9, wherein the motor current limit is a lesser one of a current limit of the inverter and a current limit of the electric machine.

12. The control system of claim 9, wherein determining the final torque limit further comprises arbitrating between the voltage-based torque limit and the current-based torque limit.

13. The control system of claim 12, wherein arbitrating between the voltage-based torque limit and the current-based torque limit further comprises the instructions causing the processor to:

determine a first motor current-based q-axis current corresponding to a d-axis current having a predetermined minimum value and corresponding to the motor current limit;

determine a second motor current-based q-axis current corresponding to the d-axis current having a predetermined maximum value and corresponding to the motor current limit;

determine a first voltage limit-based q-axis current corresponding to a d-axis current having a predetermined minimum value and corresponding to the voltage constraint of the DC bus;

determine a second voltage limit-based q-axis current corresponding to the d-axis current having a predetermined maximum value and corresponding to the voltage constraint of the DC bus;

determine one of the first motor current-based q-axis current and the first voltage limit-based q-axis current having a lesser value;

determine one of the second motor current-based q-axis current and the second voltage limit-based q-axis current having a lesser value; and select one of the current-based torque limit and the voltage-based torque limit based on the one of the first motor current-based q-axis current and the first voltage limit-based q-axis current having the lesser value and based on the one of the second motor current-based q-axis current and the second voltage limit-based q-axis current having the lesser value.

14. The control system of claim 13, wherein selecting the one of the current-based torque limit and the voltage-based torque limit further comprises the instructions causing the processor to:

select the current-based torque limit as the final torque limit in response to determining the first motor current-based q-axis current being less than the first voltage limit-based q-axis current, and the second motor current-based q-axis current being less than the second voltage limit-based q-axis current; and select the voltage-based torque limit as the final torque limit in response to determining the first voltage limit-based q-axis current being less than the first motor current-based q-axis current, and the second voltage limit-based q-axis current being less than the second motor current-based q-axis current.

15. The control system of claim 12, wherein arbitrating between the voltage-based torque limit and the current-based torque limit further comprises the instructions causing the processor to:
determine a first motor current-based q-axis current corresponding to a d-axis current having a predetermined minimum value and corresponding to the motor current limit;
determine a second motor current-based q-axis current corresponding to the d-axis current having a predetermined maximum value and corresponding to the motor current limit;
determine a first voltage limit-based q-axis current corresponding to a d-axis current having a predetermined minimum value and corresponding to the voltage constraint of the DC bus;
determine a second voltage limit-based q-axis current corresponding to the d-axis current having a predetermined maximum value and corresponding to the voltage constraint of the DC bus;
determine one of the first motor current-based q-axis current and the first voltage limit-based q-axis current having a lesser value;
determine one of the second motor current-based q-axis current and the second voltage limit-based q-axis current having a lesser value;
determine the one of the second motor current-based q-axis current and the second voltage limit-based q-axis current having the lesser value corresponding to a different constraint from the one of the first motor current-based q-axis current and the first voltage limit-based q-axis current having the lesser value;
determine a d-axis intersection current value where a q-axis current corresponding to the motor current limit is equal to a q-axis current corresponding to the voltage constraint of the DC bus; and
determine the final torque limit based on the d-axis intersection current value and based on the q-axis current corresponding to each of motor current limit and the voltage constraint of the DC bus.

16. The control system of claim 9, wherein generating the at least one current command further comprises determining the at least one current command based on the at least one preliminary motor current value, and corresponding to a supply voltage of the DC bus and to the voltage constraint of the DC bus and which would cause the electric machine to produce the limited command torque.

17. A control system for controlling operation of an electric machine, comprising:
an inverter including a plurality of switches operable to supply an alternating current to the electric machine; and
a controller operable to:
calculate a voltage-based torque limit based on a voltage constraint of a direct current (DC) bus supplying power to an inverter for powering the electric machine;
calculate a current-based torque limit based on a motor current limit;
determine a final torque limit based on the voltage-based torque limit and the current-based torque limit;
determine a limited command torque based on a torque command and the final torque limit;
generate at least one current command based on, at least, the limited command torque; and
selectively control the plurality of switches within the inverter to cause the inverter to supply the alternating current to the electric machine based on the at least one current command.

18. The control system of claim 17, wherein determining the final torque limit comprises arbitrating between the voltage-based torque limit and the current-based torque limit.

19. The control system of claim 18, wherein arbitrating between the voltage-based torque limit and the current-based torque limit further comprises the controller being operable to:
determine a first motor current-based q-axis current corresponding to a d-axis current having a predetermined minimum value and corresponding to the motor current limit;
determine a second motor current-based q-axis current corresponding to the d-axis current having a predetermined maximum value and corresponding to the motor current limit;
determine a first voltage limit-based q-axis current corresponding to a d-axis current having a predetermined minimum value and corresponding to the voltage constraint of the DC bus;
determine a second voltage limit-based q-axis current corresponding to the d-axis current having a predetermined maximum value and corresponding to the voltage constraint of the DC bus;
determine one of the first motor current-based q-axis current and the first voltage limit-based q-axis current having a lesser value;
determine one of the second motor current-based q-axis current and the second voltage limit-based q-axis current having a lesser value; and
select one of the current-based torque limit and the voltage-based torque limit based on the one of the first motor current-based q-axis current and the first voltage limit-based q-axis current having the lesser value and based on the one of the second motor current-based q-axis current and the second voltage limit-based q-axis current having the lesser value.

20. The control system of claim 19, wherein selecting the one of the current-based torque limit and the voltage-based torque limit further comprises the controller being operable to:
select the current-based torque limit as the final torque limit in response to determining the first motor current-based q-axis current being less than the first voltage limit-based q-axis current, and the second motor current-based q-axis current being less than the second voltage limit-based q-axis current; and
select the voltage-based torque limit as the final torque limit in response to determining the first voltage limit-based q-axis current being less than the first motor current-based q-axis current, and the second voltage limit-based q-axis current being less than the second motor current-based q-axis current.

* * * * *